United States Patent
Yang

(12) 
(10) Patent No.: US 11,853,497 B1
(45) Date of Patent: Dec. 26, 2023

(54) POWER MANAGEMENT FOR INPUT DEVICE

(71) Applicant: Lenovo (Singapore) Pte. Ltd., Singapore (SG)

(72) Inventor: Xinmei Yang, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/062,006

(22) Filed: Dec. 5, 2022

(51) Int. Cl.
G06F 3/041 (2006.01)

(52) U.S. Cl.
CPC .. G06F 3/0416 (2013.01); *G06F 2203/04105* (2013.01)

(58) Field of Classification Search
None
See application file for complete search history.

(56) References Cited

U.S. PATENT DOCUMENTS

| 10,572,270 B1* | 2/2020 | Sampath | G06F 9/4406 |
| 2018/0074636 A1* | 3/2018 | Lee | G06F 3/0488 |

* cited by examiner

*Primary Examiner* — Stephen T. Reed
(74) *Attorney, Agent, or Firm* — Osha Bergman Watanabe & Burton LLP

(57) ABSTRACT

An input device for a computer system includes a force sensor, disposed in a dedicated sensing region, a touch sensor, disposed in the dedicated sensing region, and a processing system. The processing system detects a presence of a force applied in the dedicated sensing region, using the force sensor, and based on the detection of the presence of the force, changes a state of the input device from an idle state to an active state. When in the idle state, touch sensing by the input device is inactive. When in the active state, the touch sensing by the input device is active.

20 Claims, 4 Drawing Sheets

US 11,853,497 B1

POWER MANAGEMENT FOR INPUT DEVICE

BACKGROUND

Progress has been made with making central components of computer devices more energy efficient. For example, today's laptop CPUs are orders of magnitude more powerful than those a few years ago, while requiring dramatically less power. To achieve further improvements, it is important to also optimize energy consumption of peripheral components such as, for example, touch pads.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to an input device for a computer system, the input device comprising: a force sensor, disposed in a dedicated sensing region; a touch sensor, disposed in the dedicated sensing region; and a processing system that: detects a presence of a force applied in the dedicated sensing region, using the force sensor, based on the detection of the presence of the force, changes a state of the input device from an idle state to an active state, wherein when in the idle state, touch sensing by the input device is inactive, wherein when in the active state, the touch sensing by the input device is active.

In general, in one aspect, embodiments relate to a method of operating an input device for a computer system comprises: detecting a presence of a force applied in a dedicated sensing region of the input device, using a force sensor disposed in the dedicated sensing region; based on the detection of the presence of the force, changing a state of the input device from an idle state to an active state, wherein when in the idle state, touch sensing by the input device is inactive, wherein when in the active state, the touch sensing by the input device is active.

In general, in one aspect, embodiments relate to a computer system comprising: a host system; and an input device communicatively interfacing with the host system, the input device comprising: a force sensor, disposed in a dedicated sensing region; a touch sensor, disposed in the dedicated sensing region; and a processing system that: detects a presence of a force applied in the dedicated sensing region, using the force sensor, based on the detection of the presence of the force, changes a state of the input device from an idle state to an active state, wherein when in the idle state, touch sensing by the input device is inactive, wherein when in the active state, the touch sensing by the input device is active.

DETAILED DESCRIPTION

Figure 1:
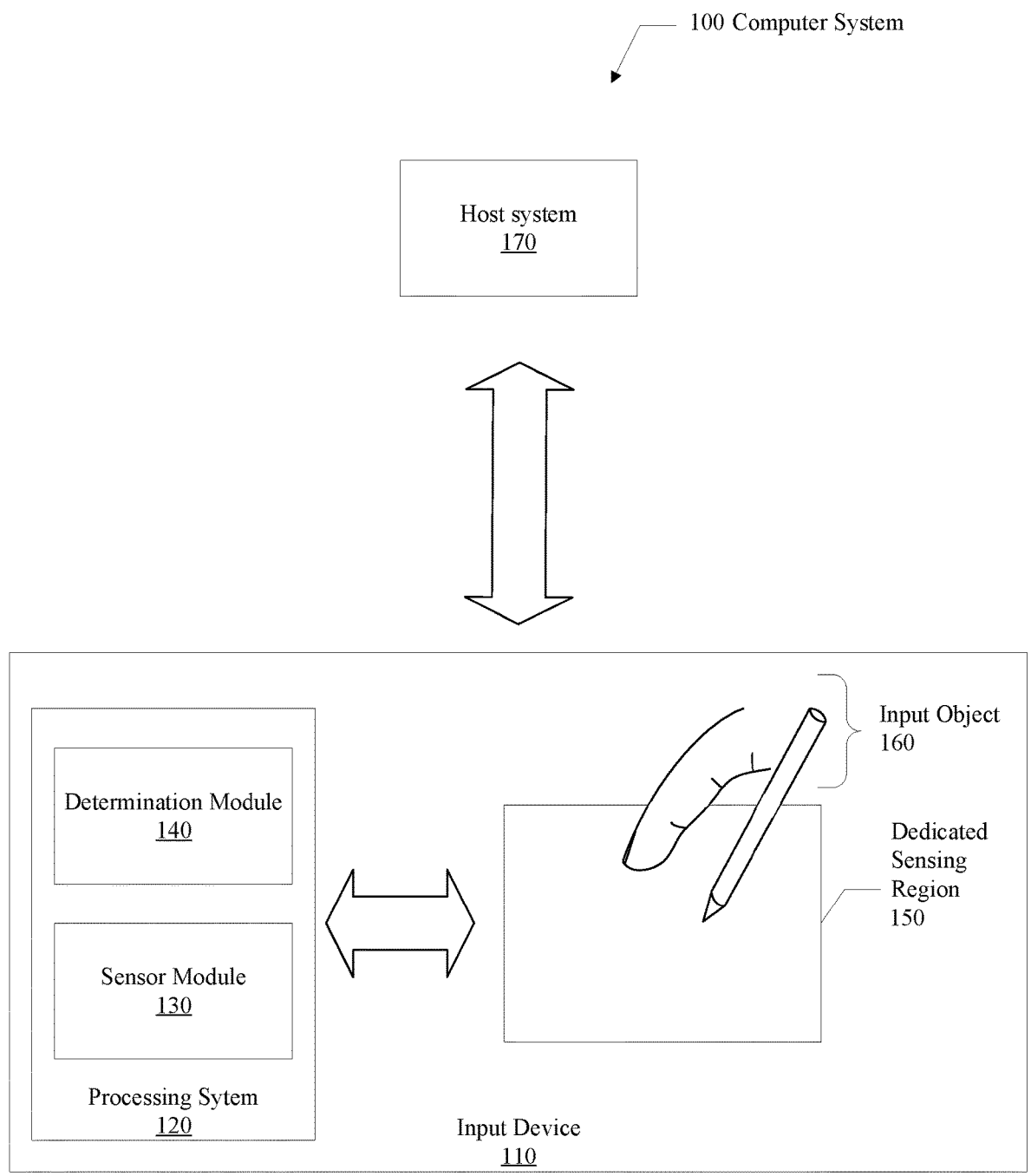
FIG. 1 shows a block diagram of a computer system that includes an input device in accordance with one or more embodiments of the disclosure.

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

Various embodiments of the present disclosure provide an input device for a computer system and methods of managing power for the input device. One or more embodiments are directed to an input device for force and touch sensing.

Turning now to the figures, FIG. 1 is a block diagram of a computer system. The computer system 100 includes an input device 110 and a host system 170. Each of these components is subsequently described.

The input device 110 may be configured to provide input to a host system 170 of the computer system 100. As used in this document, the term "computer system" refers to any system capable of electronically processing information. Some non-limiting examples of computer systems include laptop computers and netbook computers. The host system 170 may include various elements of the computer system 100, such as a host processor (e.g., a CPU), memory, a hard drive, a video interface, etc.

The input device 110 may be implemented as a physical part of the host system 170 (e.g., a touch pad integrated in the body of a laptop) or may be physically separate from the host system 170 (e.g., an external touch interface that is integrated in a keyboard, separate from the host system 170). The input device 110 may communicate with the host system 170 using any one or more of the following: buses, networks, and other wired or wireless interconnections. Examples include I2C, SPI, PS/2, Universal Serial Bus (USB), Bluetooth, RF, and IRDA.

In FIG. 1, the input device 110 is shown as a proximity sensor device (also often referred to as a "touchpad" or a "touch sensor device") configured to sense input provided by one or more input objects 160 in a dedicated sensing region 150. As used in this document, the term "dedicated sensing region" refers to any sensing region of an input device for a computer system that does not form a touch screen interface. In other words, the dedicated sensing region cannot be a combination of an input device disposed on a display device to form a touch screen, and embodiments of the disclosure, therefore, exclude touch displays. The dedicated sensing region may be a touchpad of a laptop computer or a netbook computer. The input objects 160 may include a finger, a stylus, as shown in FIG. 1, or any other object that may be detected in the dedicated sensing region 150. Throughout the specification, the singular form of input object is used. Although the singular form is used, multiple input objects may exist in the dedicated sensing region 150. Further, which particular input object 160 is in the dedicated sensing region 150 may change over the course of one or more gestures. To avoid unnecessarily complicating the description, the singular form of at least one input object is used and refers to all of the above variations.

The dedicated sensing region 150 encompasses any space above, around, in and/or near the input device 110 in which the input device 110 is able to detect user input (e.g., user input provided by one or more input objects 160). The sizes, shapes, and locations of particular sensing regions may vary widely from embodiment to embodiment.

In some embodiments, the dedicated sensing region 150 extends from a surface of the input device 110 in one or more directions into space until signal-to-noise ratios prevent sufficiently accurate object detection. The extension above the surface of the input device may be referred to as the above surface sensing region. The distance to which this dedicated sensing region 150 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 110, contact with an input surface (e.g. a touch surface) of the input device 110, contact with an input surface of the input device 110 coupled with some amount of applied force or pressure, and/or a combination thereof. In some embodiments, the input device 110 senses force applied in the dedicated sensing region 150. Further, in some embodiments, the input device 110 may sense touch, in addition to force. In various embodiments, input surfaces may be provided by surfaces of casings within which the sensor electrodes reside, by face sheets applied over the sensor electrodes or any casings, etc. In some embodiments, the dedicated sensing region 150 has a rectangular shape when projected onto an input surface of the input device 110.

The input device 110 may utilize any combination of sensor components and sensing technologies to detect user input in the dedicated sensing region 150. The input device 110 includes one or more sensing elements for detecting user input such as touch and/or force. As several non-limiting examples, the input device 110 may use capacitive, elastive, resistive, inductive, magnetic, acoustic, ultrasonic, piezoelectric, strain gauge-based, and/or optical techniques.

Some implementations are configured to provide projections of input along particular axes or planes. Further, some implementations may be configured to provide a combination of one or more projections.

In some resistive implementations of the input device 110, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 110, one or more sensing elements pick up loop currents induced by a resonating coil or pair of coils. Some combination of the magnitude, phase, and frequency of the currents may then be used to determine positional information.

In some capacitive implementations of the input device 110, voltage or current is applied to create an electric field. Nearby input objects cause changes in the electric field and produce detectable changes in capacitive coupling that may be detected as changes in voltage, current, or the like. The presence of a touch may thus be detected in this implementation establishing a touch sensor. Further, in some capacitive implementations, an elastic element is included between sensing electrodes. Deformation may cause a change in the distance between sensing electrodes. The presence of a force, causing the deformation, may thus be detected in such an implementation establishing a force sensor.

Some capacitive implementations utilize arrays or other regular or irregular patterns of capacitive sensing elements to create electric fields. Such arrays may be scanned to obtain touch or force information from many locations across the dedicated sensing region 150. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage, and in various embodiments the reference voltage may be system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system 120 is shown as part of the input device 110. The processing system 120 is configured to operate the hardware of the input device 110 to detect input in the dedicated sensing region 150. The processing system 120 includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry and/or circuitry for other types of sensing modalities such as strain gauges, resistive sensors, piezoelectric sensors, etc. In some embodiments, the processing system 120 also includes electronically-readable instructions, such as firmware code, software code, and/or the like. In some embodiments, components composing the processing system 120 are located together, such as near sensing element(s) of the input device 110. In other embodiments, components of processing system 120 are physically separate with one or more components close to the sensing element(s) of the input device 110, and one or more components elsewhere. For example, the input device 110 may be a peripheral coupled to a host system 170 of a computing system 100, and the processing system 120 may include software configured to run on a central processing unit of the host system and one or more ICs (perhaps with associated firmware) separate from the central processing unit. As another example, the input device 110 may be physically integrated in a computer system, and the processing system 120 may include circuits and firmware that are part of a main processor of the computer system. In some embodiments, the processing system 120 is dedicated to implementing the input device 110. In other embodiments, the processing system 120 also performs other functions, such as driving haptic actuators, etc.

The processing system 120 may be implemented as a set of modules that handle different functions of the processing system 120. Each module may include circuitry that is a part of the processing system 120, firmware, software, or a combination thereof. In various embodiments, different combinations of modules may be used. For example, as shown in FIG. 1, the processing system 120 may include a determination module 140 and a sensor module 130. The determination module 140 may include functionality to determine when the input object 160 is in the dedicated sensing region 150, determine signal to noise ratio, determine positional information of the input object 160, identify a gesture, determine an action to perform based on the gesture, a combination of gestures or other information, and/or perform other operations.

The sensor module 130 may include functionality to drive the sensing elements to transmit transmitter signals and receive the resulting signals. For example, the sensor module 130 may include sensory circuitry that is coupled to the sensing elements. The sensor module 130 may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module 140 and a sensor module 130, alternative or additional modules may exist in accordance with one or more embodiments of the disclosure. Example alternative or additional modules include hardware operation modules for operating hardware such as sensor electrodes, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system 120 as a whole may perform the operations of the various modules.

In some embodiments, the processing system 120 responds to user input (or lack of user input) in the dedicated sensing region 150 directly by causing one or more actions. Example actions include changing operation modes, as well as graphical user interface (GUI) actions such as cursor movement, selection, menu navigation, and other functions. In some embodiments, the processing system 120 provides information about the input (or lack of input) to some part of the host system 170. In some embodiments, some part of the host system 170 processes information received from the processing system 120 to act on user input, such as to facilitate a full range of actions, including mode changing actions and GUI actions.

For example, in some embodiments, the processing system 120 operates the sensing element(s) of the input device 110 to produce electrical signals indicative of input (or lack of input) in the dedicated sensing region 150. The processing system 120 may perform any appropriate amount of processing on the electrical signals to produce the information provided to the host system 170. For example, the processing system 120 may digitize analog electrical signals obtained from the sensor electrodes. As another example, the processing system 120 may perform filtering or other signal conditioning. As yet another example, the processing system 120 may subtract or otherwise account for a baseline, such that the information reflects a difference between the electrical signals and the baseline. As yet further examples, the processing system 120 may determine positional information, recognize inputs as commands, recognize handwriting, and the like.

"Positional information" or "location" as used herein broadly encompasses absolute position, relative position, velocity, acceleration, and other types of spatial information. "Zero-dimensional" positional information may include near/far or contact/no contact information. "One-dimensional" positional information may include positions along an axis. "Two-dimensional" positional information may include motions in a plane. "Three-dimensional" positional information may include instantaneous or average velocities in space. Further examples include other representations of spatial information. Historical data regarding one or more types of positional information may also be determined and/or stored, including, for example, historical data that tracks position, motion, or instantaneous velocity over time.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information-bearing media that are readable by electronic processors (e.g., non-transitory computer-readable and/or recordable/writable information bearing media that is readable by the processing system 120). Additionally, the embodiments of the present disclosure apply equally regardless of the particular type of medium used to carry out the distribution. For example, software instructions in the form of computer readable program code to perform embodiments of the disclosure may be stored, in whole or in part, temporarily or permanently, on a non-transitory computer-readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system 120, the input device 110, and/or the host system 170 may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be central processing unit (CPU), one or more cores or micro-cores of a processor, etc. Further, one or more elements of one or more embodiments may be located at a remote location and connected to the other elements over a network.

While FIG. 1 shows a configuration of components, other configurations may be used without departing from the scope of the disclosure. For example, various components may be combined to create a single component. As another example, the functionality performed by a single component may be performed by two or more components.

Figure 2:
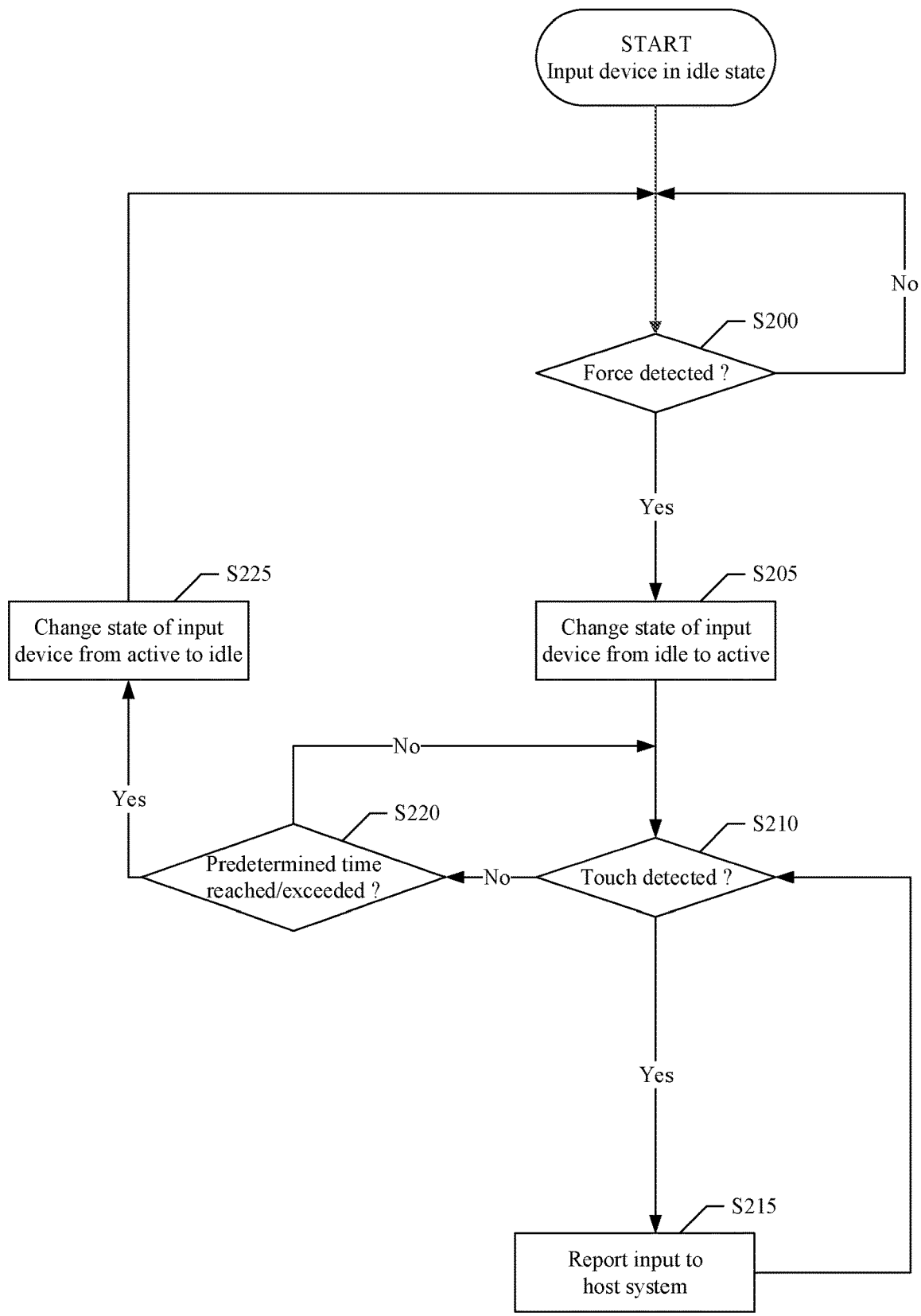
FIG. 2 shows a flowchart for a method of operating an input device transitioning from an idle state to an active state in accordance with one or more embodiments of the disclosure.

FIG. 2 shows a flowchart for a method of operating an input device transitioning between an idle state and an active state in accordance with one or more embodiments of the disclosure. The idle state is characterized by touch sensing by the input device 110 being inactive and force sensing by the input device 110 being active. The idle state may have been reached, for example, because no touch was detected in the predetermined sensing region 150 for at least a predetermined time, as further discussed below. In idle state, power is cut to any unneeded systems, while the processing system receives just enough power for force sensing by the input device 110.

In Step S200, the processing system 120 scans the dedicated sensing region 150 of the input device 110 to detect a presence of a force provided by one or more input objects 160 in the dedicated sensing region 150, using one or more force sensors. The force sensing may be performed as previously described. The input device 110 remains in the idle state if no force is detected by the one or more force sensors. Upon detection of a force, the execution of the method proceeds with Step S205.

In Step S205, the state of the input device is changed from the idle state to an active state. The transition to the active state includes an activation of the touch sensing. As a result, the one or more touch sensors are able to detect a touch by an input object 160 in the dedicated sensing region 150.

In Step S210, the processing system 120 scans the dedicated sensing region 150 of the input device 110 to detect a presence of a touch by one or more input objects 160 using the one or more touch sensors. The touch sensing is performed as previously described. The touch sensing may involve determining a location of the touch in the dedicated sensing region, if a touch is detected. Further, if a touch is detected, the execution of the method may proceed with Step S215. If no touch is detected, the execution of the method may proceed with Step S220.

In Step S215, the detected touch is reported to the host system. Reporting the detected touch may involve reporting the location of the touch to the host system. After the execution of Step S215, the execution of the method may continue by repeating Step S210.

In Step S220, a test is performed to determine whether a predetermined time since the last detected touch has passed. In absence of a touch in the dedicated sensing region for at least the predetermined time, the execution of the method may proceed with Step S225. If the predetermined time has not passed, the execution of the method may continue with Step S210 to perform another touch sensing.

In Step S225, the state of the input device is changed from active to idle. Step S225 may be performed to increase power savings. After the execution of Step S225, the execution of the method may proceed with Step S200.

Figure 3:
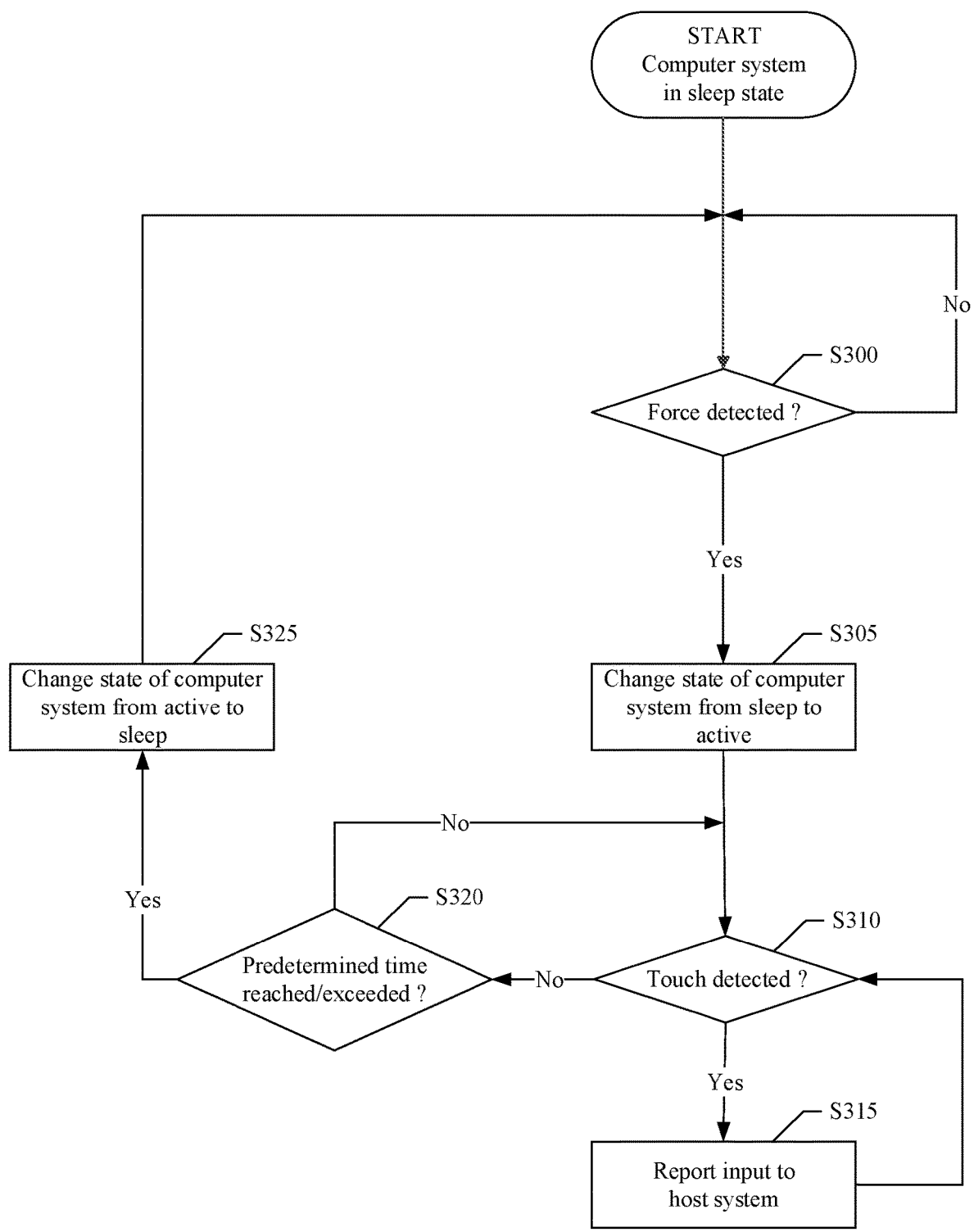
FIG. 3 shows a flowchart for a method for operating an input device, for a computer system transitioning from a sleep state to an active state in accordance with one or more embodiments of the disclosure.

FIG. 3 shows a flowchart for a method of operating an input device, for a computer system transitioning between a sleep state and an active state in accordance with one or more embodiments of the disclosure. The sleep state is characterized by touch sensing by the input device 110 being inactive and force sensing by the input device 110 being active. In sleep state, power is cut to any unneeded systems of the computer system, while a few components of the computer system remain powered to at least a limited extent to allow a wakeup once requested. For example, the random access memory (RAM) of the host system receives just enough power to maintain data of the computer system's state, while the CPU of the host system may be in a sleep mode.

In Step S300, the processing system 120 scans the sensing region 150 to detect a presence of a force provided by one or more input objects 160 in the dedicated sensing region 150, using one or more force sensors. The computer system 100 will remain in the sleep state if no force is detected by the one or more force sensors. Upon detection of a force, the execution of the method proceeds with Step S305.

In Step S305, the state of the computer system is changed from the sleep state to an active state. The transition to the active state includes an activation of the touch sensing. As a result, the one or more touch sensors are able to detect a touch by an input object 160 in the dedicated sensing region 150. The transition to the active state further includes a wakeup of the host system. For example, during the wakeup, the CPU of the host system may restore the last state of the host system from RAM.

In step S310, the processing system 120 scans the sensing region 150 of the input device 110 to detect a presence of a touch provided by one or more input objects 160 using the one or more touch sensors. The touch sensing may involve determining a location of the touch in the dedicated sensing region, if a touch is detected. Further, if a touch is detected, the execution of the method may proceed with Step S315. If no touch is detected, the execution of the method may proceed with Step S320

In Step S315, the detected touch is reported to the host system. Reporting the detected touch may involve reporting the location of the touch to the host system. After the execution of Step S315, the execution of the method may continue by repeating Step S310.

In Step S320, a test is performed to determine whether a predetermined time since the last detected touch has passed. In absence of a touch in the dedicated sensing region for at least the predetermined time, the execution of the method may proceed with Step S325. If the predetermined time has not passed, the execution of the method may continue with Step S310 to perform another touch sensing.

In Step S325, the state of the computer system is changed from active to sleep. Step S325 may be performed to increase power savings. After the execution of Step S325, the execution of the method may proceed with Step S300.

Figure 4:
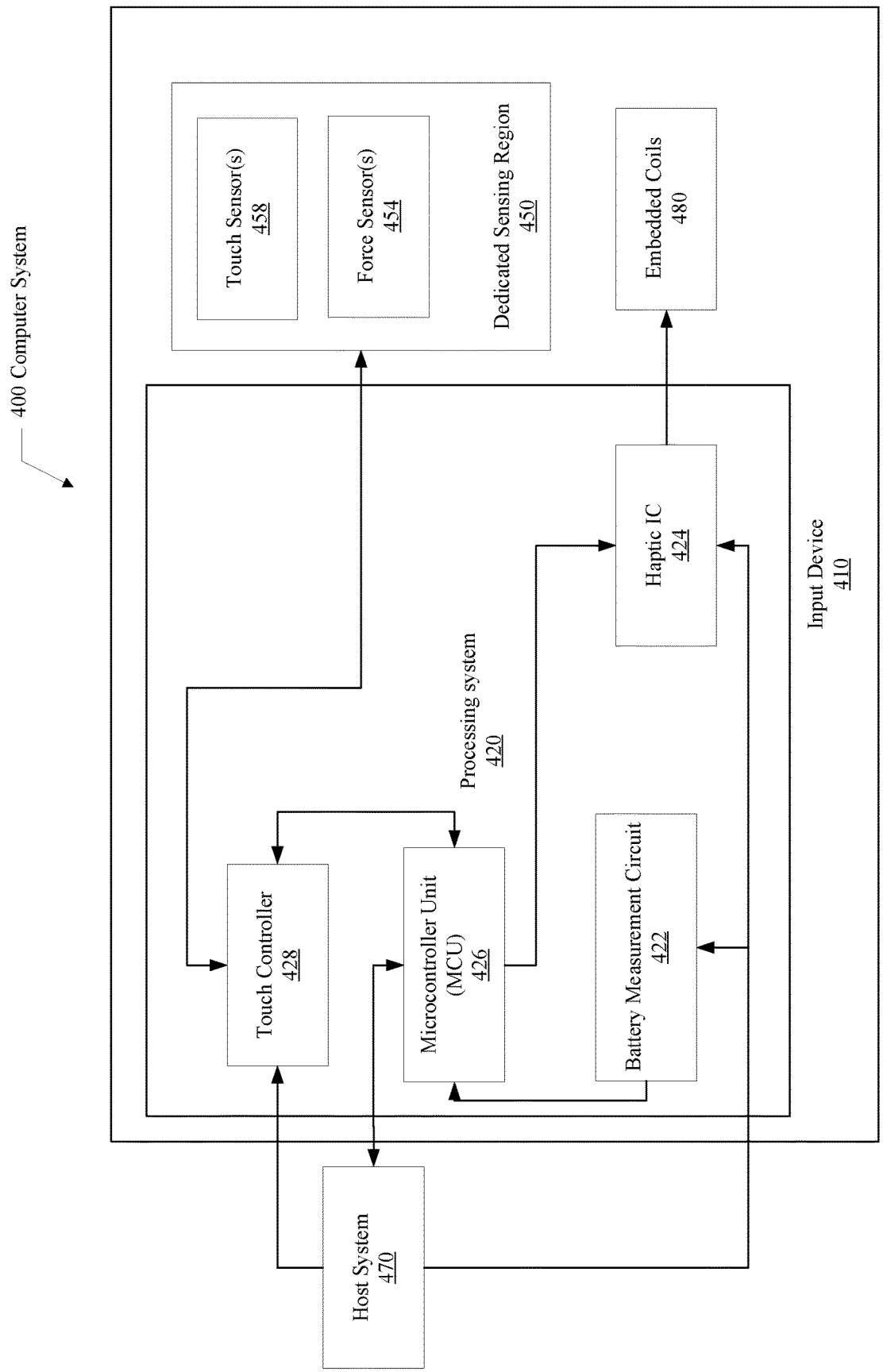
FIG. 4 shows a block diagram of an example implementation of an input device for a computer system in accordance with one or more embodiments of the disclosure.

FIG. 4 shows a block diagram of an implementation of an input device for a computer system 400 in accordance with one or more embodiments of the disclosure.

In FIG. 4, the input device 410 comprises a processing system 420, a dedicated sensing region 450, and one or more embedded coils 480. The dedicated sensing region 450 comprises one or more force sensors 454 and one or more touch sensors 458. The force sensors 454 and the touch sensors 458 may be as previously described.

The processing system 420 includes a battery measurement circuit 422, a haptic IC 424, a microcontroller unit (MCU) 426, and touch controller 428. Each of these components is subsequently described.

The processing system 420 is shown as part of the input device 410. The processing system 420 is configured to operate the hardware of the input device 410 to detect input in the dedicated sensing region 450. The processing system 420 may communicatively interface with a host system 470, the one or more force sensors 454, the one or more touch sensors 458, and one or more embedded coils 480.

The battery measurement circuit 422 provides an estimate of the computer system 400 battery's capacity despite of fade of its full charge capacity during repeated use, to allow generation of an accurate indication of remaining run-time of the battery of the computer system 400. The battery measurement circuit 422 may communicatively interface with the MCU 426 and the host system 470. In one embodiment, the output of the battery measurement circuit 422 is used to maintain a haptic output (provided by a haptic IC 424 driving one or more embedded coils as discussed below) in presence of a decreasing battery voltage as the remaining battery capacity drops. A user may thus experience the same haptic output regardless of the remaining battery capacity.

The haptic IC 424 drives the embedded coils 480 to generate a haptic effect such as a vibration. The haptic effect may be generated in response to a detected touch or for any other reason. The haptic IC 424 may communicatively interface with the host system 470, the MCU 426. Accordingly, both the host system 470 and the MCU 426 may initiate a haptic effect.

The MCU 426 coordinates touch processing, force processing, and haptics triggering. The MCU 426 may establish a communication interface between the host system 470, the touch controller 428, the battery measurement circuit 422, and the haptic IC 424.

The touch controller 428 scans the sensing region 450 of the input device 410 to detect a presence of a force and/or a touch applied in the dedicated sensing region 450, using the one or more force sensors 454 and/or the one or more touch sensors 458, respectively. Briefly summarized, the touch controller may perform the operations of the processing system 120 of FIG. 1. The touch controller 428 may communicatively interface with the host system 470, the MCU 426, the one or more force sensors 454, and the one or more touch sensors 458.

In one or more embodiments, one or more of the components shown in FIG. 4 achieve power savings by performing one or more of the steps of the flowcharts of FIGS. 2 and 3.

Specifically, in one implementation, the touch controller 428 controls both touch sensor 458 and force sensor 454. The touch sensor 558 may have a number of channels (e.g., 20 channels), and the force sensor 454 may have a number of channels (e.g., 4 channels). When changing the state of the input device from the active state to the idle state, the touch controller 428 may deactivate the touch sensor 458 by deactivating all channels. The channels are deactivated by the touch controller stopping driving the sensor electrodes corresponding to the channels, and further by stopping scanning the sensor electrodes to detect the presence of input objects indicated by changes in the charge balance across the sensor electrodes. Further, some channels of the force sensor may also be deactivated (by stopping driving the corresponding sensor electrodes), because fewer or even just a single channel may be sufficient to detect the presence of a force. In the described implementation, the integrated circuits themselves (e.g., touch controller 428, MCU 426 remain active).

In another implementation, separate integrated circuits may be used for the touch sensing and the force sensing. In other words, there may be a touch controller 428 and a force controller (not shown). In such an implementation, the touch controller may be powered down when no touch sensing is performed, while the force controller may continue to operate. The force controller may wake up the touch controller when a force is detected, either by directly sending a wakeup signal, or indirectly via the MCU 426.

While FIG. 4 shows a particular configuration of components, other configurations may be used, without departing from the disclosure. For example, the embedded coils 480 and the haptic IC 424 may not be present in a configuration that does not provide haptic feedback, the MCU 426 may not exist in configurations where the MCU functionality is part of, for example, the touch controller 424.

Embodiments of the disclosure have one or more of the following advantages. Embodiments of the disclosure may provide power savings when the input device is in the idle state or when the computer system is in the sleep state. Substantial energy savings are realized by not scanning the touch sensor when in the idle/sleep state. In contrast, the scanning of the force sensor continues when in the idle/sleep state. The scanning of the force sensor may require very little energy. By continuously scanning the force sensor even when in idle/sleep state, a rapid transition to the active state is ensured, thereby providing a good user experience while minimizing power consumption.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. An input device for a computer system, the input device comprising:
    a force sensor, disposed in a dedicated sensing region;
    a touch sensor, disposed in the dedicated sensing region, wherein the dedicated sensing region is in absence of a display; and
    a processing system that:
        detects a presence of a force applied in the dedicated sensing region, using the force sensor,
        based on the detection of the presence of the force, changes a state of the input device from an idle state to an active state,
        wherein when in the idle state, touch sensing by the input device is inactive while force sensing is active,
        wherein when in the active state, the touch sensing by the input device is active.

2. The input device according to claim 1, wherein the touch sensing comprises:
    determining a location of a touch in the dedicated sensing region by the touch sensor, and
    based on the detection, reporting the location to a host system of the computer system.

3. The input device according to claim 1, wherein the processing system further:
    detects an absence of touch in the dedicated sensing region for at least a predetermined time, and
    based on the detection of the absence of touch, changes the state of the input device from the active state to the idle state.

4. The input device according to claim 3,
    wherein the processing system comprises a touch controller, and
    wherein changing the state of the input device from the active state to the idle state comprises:
        stopping driving sensor electrodes of the touch sensor, and
        stopping scanning the sensor electrodes of the touch sensor.

5. The input device according to claim 4,
    wherein changing the state of the input device from the active state to the idle state further comprises:
        continuing driving at least a first of a plurality of sensor electrodes of the force sensor, and
        stopping driving at least a second of the plurality of sensor electrodes of the force sensor.

6. The input device according to claim 3,
    wherein the processing system comprises a touch controller and a force controller, and
    wherein changing the state of the input device from the active state to the idle state comprises:
        powering down the touch controller, and
        continuing operating the force controller.

7. The input device according to claim 1, wherein the processing system:
    based on the detection of the presence of the force, changes a state of the computer system from a sleep state to an active state.

8. The input device according to claim 1, wherein:
    the force sensor comprises at least one selected from a group consisting of a capacitive force sensor, a resistive force sensor, an elastive force sensor, an inductive force sensor, a piezoelectric force sensor, and a strain sensor.

9. The input device according to claim 1, wherein:
    the touch sensor comprises at least one selected from a group consisting of a capacitive touch sensor, a resistive touch sensor, and a piezoelectric touch sensor.

10. A method of operating an input device for a computer system comprises:
    detecting a presence of a force applied in a dedicated sensing region of the input device, using a force sensor disposed in the dedicated sensing region, wherein the dedicated sensing region is in absence of a display;
    based on the detection of the presence of the force, changing a state of the input device from an idle state to an active state,
    wherein when in the idle state, touch sensing by the input device is inactive while force sensing is active,
    wherein when in the active state, the touch sensing by the input device is active.

11. The method according to claim 10, wherein the touch sensing comprises:
    determining a location of a touch in the dedicated sensing region by the touch sensor, and
    based on the detection, reporting the location to a host system of the computer system.

12. The method according to claim 10, wherein operating the input device further comprises:
    detecting an absence of touch in the dedicated sensing region, for at least a predetermined time, and
    based on the detection of the absence of touch, changing the state of the input device from the active state to the idle state.

13. The method according to claim 10, wherein operating the input device further comprises:
    based on the detection of the presence of the force, changing a state of the computer system from a sleep state to an active state.

14. The method according to claim 10, wherein:
    the force sensor comprises at least one selected from a group consisting of a capacitive force sensor, a resistive force sensor, an elastive force sensor, an inductive force sensor, a piezoelectric force sensor, and a strain sensor.

15. The method according to claim 10, wherein:
    the touch sensor comprises at least one selected from a group consisting of a capacitive touch sensor, a resistive touch sensor, and a piezoelectric touch sensor.

16. A computer system comprising:
    a host system; and
    an input device communicatively interfacing with the host system, the input device comprising:
        a force sensor, disposed in a dedicated sensing region;
        a touch sensor, disposed in the dedicated sensing region,
        wherein the dedicated sensing region is in absence of a display; and
        a processing system that:
            detects a presence of a force applied in the dedicated sensing region, using the force sensor,
            based on the detection of the presence of the force, changes a state of the input device from an idle state to an active state, wherein when in the idle state, touch sensing by the input device is inactive while force sensing is active, wherein when in the active state, the touch sensing by the input device is active.

17. The computer system according to claim 16, wherein the processing system further:
   detects an absence of touch in the dedicated sensing region for at least a predetermined time, and
   based on the detection of the absence of touch, changes the state of the input device from the active state to the idle state.

18. The computer system according to claim 17,
wherein the processing system comprises a touch controller, and
wherein changing the state of the input device from the active state to the idle state comprises:
   stopping driving sensor electrodes of the touch sensor, and
   stopping scanning the sensor electrodes of the touch sensor.

19. The computer system according to claim 18,
wherein changing the state of the input device from the active state to the idle state further comprises:
   continuing driving at least a first of a plurality of sensor electrodes of the force sensor, and
   stopping driving at least a second of the plurality of sensor electrodes of the force sensor.

20. The computer system according to claim 17,
wherein the processing system comprises a touch controller and a force controller, and
wherein changing the state of the input device from the active state to the idle state comprises:
   powering down the touch controller, and
   continuing operating the force controller.

* * * * *